United States Patent
Mithra et al.

(10) Patent No.: US 10,770,069 B2
(45) Date of Patent: Sep. 8, 2020

(54) SPEECH PROCESSING AND CONTEXT-BASED LANGUAGE PROMPTING

(71) Applicant: International Business Machines Corporation, Armonk, NY (US)

(72) Inventors: Sripathi S. Mithra, Bangalore (IN); Sirisha Akella, Seethammadhara (IN); Venkata Alubelli, Visakhapatnam (IN); Saraswathi S. Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 16/002,241

(22) Filed: Jun. 7, 2018

(65) Prior Publication Data
US 2019/0378501 A1 Dec. 12, 2019

(51) Int. Cl.
H04L 12/18 (2006.01)
G10L 15/22 (2006.01)
G10L 15/18 (2013.01)
G10L 25/78 (2013.01)

(52) U.S. Cl.
CPC .......... *G10L 15/22* (2013.01); *G10L 15/1815* (2013.01); *G10L 25/78* (2013.01); *G10L 2015/223* (2013.01); *G10L 2015/227* (2013.01); *H04L 12/1822* (2013.01)

(58) Field of Classification Search
CPC .................................................. H04L 12/1822
See application file for complete search history.

(56) References Cited

U.S. PATENT DOCUMENTS

| | | | |
|---|---|---|---|
| 9,814,426 B2 * | 11/2017 | Connor | A61B 5/0476 |
| 2004/0210820 A1 * | 10/2004 | Tarr | G06Q 30/0203 715/230 |
| 2014/0115065 A1 * | 4/2014 | Harpur | H04L 12/1822 709/205 |
| 2014/0223462 A1 | 8/2014 | Aimone et al. | |
| 2016/0011729 A1 | 1/2016 | Flores et al. | |
| 2016/0117597 A1 | 4/2016 | Ono et al. | |

(Continued)

FOREIGN PATENT DOCUMENTS

JP 3376487 B2 * 2/2003

OTHER PUBLICATIONS

Tanveer et al., Rhema: A Real-Time In-Situ Intelligent Interface to Help People with Public Speaking, https://www.csrochester.edu/hci/pubs/pdfs/rocspeakglass.pdf, IUI, 2015, 10 pages.

(Continued)

*Primary Examiner* — Feng-Tzer Tzeng
(74) *Attorney, Agent, or Firm* — Reza Sarbakhsh; Edell, Shapiro & Finnan, LLC

(57) ABSTRACT

A computer system processes speech. Speech of a user is received from an audio sensor. An interruption in the speech of the user is determined and the speech of the user is analyzed to determine a context of the speech. One or more language data sources are analyzed to generate a suggestion corresponding to the interruption and based on the context of the speech. The suggestion is presented to the user. Embodiments of the present invention further include a method and program product for prompting a user in substantially the same manner described above.

15 Claims, 4 Drawing Sheets

(56) References Cited

U.S. PATENT DOCUMENTS

2017/0147154 A1     5/2017    Steiner et al.
2017/0235839 A1     8/2017    Shaw et al.

OTHER PUBLICATIONS

Filler Killer app for Domestos brand, https://vimeo.com/92924924, Vimeo, retrieved from internet Jun. 2018, 2 pages.

Technology to communicate with someone with expressive aphasia?, https://stackoverflow.com/questions/1937782/technology-to-communicate-with-someone-with-expressive-aphasia%C2%A0, retrieved from Internet Jun. 2018, 9 pages.

Kane et al, What we talk about: designing a context-aware communication tool for people with aphasia, http://dl.acm.org/citation.cfm?id=2384926, ASSETS '12 Proceedings of the 14th international ACM SIGACCESS conference on Computers and accessibility, Oct. 2012, pp. 49-56.

How to use SentenceShaper, http://sentenceshaper.com/how-to-videos/, Psycholinguistic Technologies, Inc., 2018, 3 pages.

\* cited by examiner

SPEECH PROCESSING AND CONTEXT-BASED LANGUAGE PROMPTING

BACKGROUND

1. Technical Field

Present invention embodiments relate to speech processing, and more specifically to prompting a speaker when the speaker encounters a speech disfluency based on the context of a conversation.

2. Discussion of the Related Art

A speech disfluency refers to a break or irregularity that occurs during otherwise fluent speech. A speech disfluency can include a pause in speech or a filler (such as "huh," "um," or "uh"). A speaker may encounter a speech disfluency when the speaker pauses to recollect a particular detail, or forgets what they were going to say next. Disorders affecting the brain, such as aphasia, can result in abnormal speech and increase the likelihood of speech disfluencies.

Often, an individual can overcome a speech disfluency if prompted with a particular word or phrase. In order to successfully prompt an individual, however, the prompting word or phrase must be properly selected so that it successfully jogs the user's memory.

SUMMARY

According to one embodiment of the present invention, a computer system processes speech. Speech of a user is received from an audio sensor. An interruption in the speech of the user is determined and the speech of the user is analyzed to determine a context of the speech. One or more language data sources are analyzed to generate a suggestion corresponding to the interruption and based on the context of the speech. The suggestion is presented to the user. Embodiments of the present invention further include a method and program product for utilizing a dataset to support a research study in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to prompting a speaker when the speaker encounters a speech disfluency, and more specifically, to prompting a speaker based on the context of a conversation. For example, if a speaker is in a conversation and encounters a speech disfluency, prompting the speaker with a word or phrase might jog the speaker's memory and enable the speaker to complete their speech. Present invention embodiments monitor a user's speech to detect such speech disfluencies and in response, prompt the user with a word or phrase intended to help the user complete their speech. Thus, present invention embodiments can assist a user suffering from a speech disorder, such as aphasia, or enable a user to be more articulate during a conversation. In order to determine a particular word or phrase with which to prompt the user, a variety of language data sources may be analyzed. Language data sources may include the context of a conversation in which the user is currently engaged, along with a user's own written and oral communications, brain data obtained from the user, and general samples of language found in sources such as newspapers or websites.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
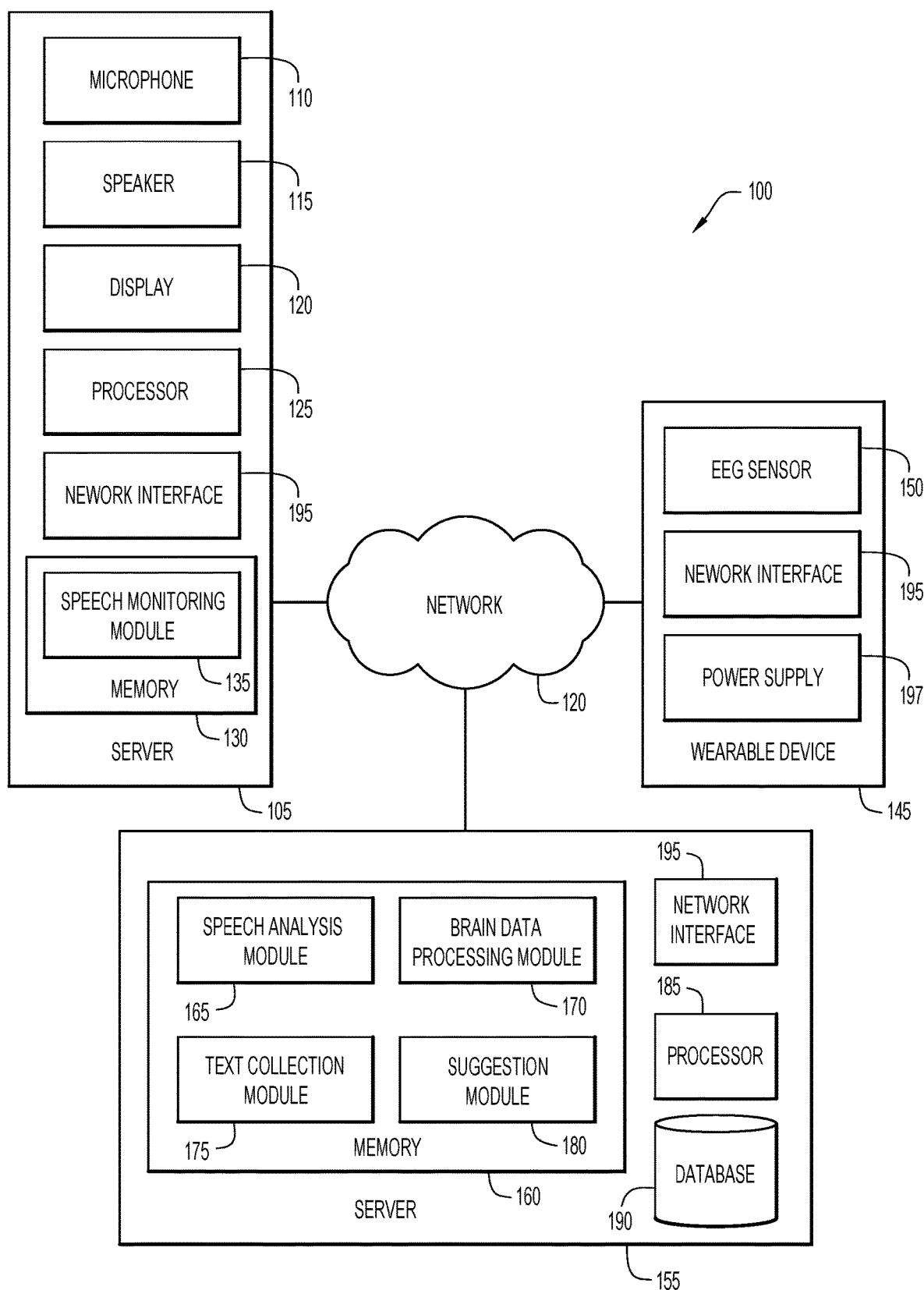
FIG. 1 is a block diagram depicting a computing environment for prompting a user in accordance with an embodiment of the present invention.

Present invention embodiments will now be described in detail with reference to the Figures. FIG. 1 is a block diagram depicting a computing environment 100 for prompting a user in accordance with an embodiment of the present invention. As depicted, computing environment 100 includes a user device 105, network 140, a wearable device 145, and a server 155. It is to be understood that the functional division among components of computing environment 100 have been chosen for purposes of explaining the present invention and is not to be construed as a limiting example.

User device 105 includes a microphone 110, audio speaker 115, display 120, processor 125, network interface 195, and memory 130 with speech monitoring module 135. User device 105 may include a laptop computer, a tablet computer, a netbook computer, a personal computer (PC), a desktop computer, a personal digital assistant (PDA), a smart phone, a thin client, or any programmable electronic device capable of executing computer readable program instructions.

Microphone 110 may include any transducer capable of converting sound to an electrical signal, and audio speaker 115 may include any transducer capable of converting an electrical signal to sound. Display 120 may include any output device for presenting information in a visual form, such as a liquid crystal display (LCD) or a light-emitting diode (LED) display. Microphone 110 may enable user device 105 to monitor nearby speech, and audio speaker 115 and display 120 may enable user device 105 to prompt a user with an auditory prompt or a visual prompt, respectively. Microphone 110 may monitor a user's speech during a phone call or video chat made via user device 105, or a user's speech that is made in proximity to user device 105.

Speech monitoring module 135 may reside in memory 130 and use processor 125 to carry out aspects of embodiments of the present invention. Speech monitoring module 135 may receive data from microphone 110 in order to monitor speech in proximity to user device 105. Speech monitoring module 135 may monitor the speech of a user of user device 105 in order to detect disfluencies in the user's speech, such as pauses or fillers. For example, speech monitoring module 135 may detect that a user has stopped speaking mid-sentence, or has started speaking with filler words (e.g., grunts, "um," "like," etc.) instead of speaking properly. Speech monitoring module 135 may use conventional or other speech processing or speech recognition techniques to detect the occurrence of a speech disfluency. For example, speech monitoring module 135 may detect speech disfluencies using a Hidden Markov model, dynamic time warping, neural networks, deep learning, etc.

Speech monitoring module 135 may distinguish speech disfluencies from natural pauses, such as when a user has finished speaking or has posed a question to another conversation participant. In some embodiments, speech monitoring module 135 is trained to recognize the voice of the user of user device 105, so that speech monitoring module 135 may specifically monitor the user's speech during a conversation between multiple parties. When a speech disfluency occurs in a user's speech, speech monitoring module 135 may notify server 155 via network 140.

Network 140 may include a local area network (LAN), a wide area network (WAN) such as the Internet, or a combination of the two, and includes wired, wireless, or fiber optic connections. In general, network 140 can be any combination of connections and protocols that will support communications between user device 105, wearable device 145, and/or server 155 in accordance with embodiments of the present invention. User device 105, wearable device 145, and server 155 may communicate over network 140 using their network interfaces 195.

Wearable device 145 includes at least one electroencephalography (EEG) sensor 150, a network interface 195, and a power supply 197. Wearable device 145 may be worn on a user such that EEG sensor 150 can affix to the user's head. EEG sensor 150 may be any electrophysiological monitoring device capable of monitoring biosignals from the brain of a user. Wearable device 145 may have one or multiple EEG sensors 150 that attach to various locations on a human head. In some embodiments, each EEG sensor 150 is a dry-type sensor that does not require a fluid medium between the contact point of the sensor and the user's head in order to receive biosignals. Wearable device 145 may send information gathered by EEG sensor 150 to user device 105 and/or server 155 over network 140. Power supply 197 may provide power to EEG sensors 150 and/or network interface 195, and may be an electrochemical cell (e.g., a battery), a wireless power source (e.g. using inductive or capacitive coupling), or a wired power source.

Server 155 includes memory 160, a network interface 195, a processor 185, and a database 190. A speech analysis module 165, a brain data processing module 170, a text collection module 175, and a suggestion module 180 may reside in memory 160 and may use processor 185 to carry out aspects of embodiments of the present invention. In general, server 155 and its modules analyzes multiple language data sources in order to determine a word or phrase with which to prompt a user who is experiencing a speech disfluency. Language data sources may include any sources of information that can be used as input when determining how to prompt a user, such as a user's past speech history, a user's brain data, the context of a conversation in which the user is a participant, a user's writings, and any examples of written or spoken language in general, such as websites, newspapers, encyclopedias, etc.

Speech analysis module 165 may analyze samples of a user's speech to determine the language preferences that make up the user's speech patterns. A user's language preferences may include word choice, responses to particular questions, reactions to particular statements, tendency toward prolixity or terseness, use of vernacular, regionalisms, or slang, and any other preference relating to speech. In some embodiments, speech analysis module 165 receives samples of a user's speech that are recorded by microphone 110 of user device 105. Speech analysis module 165 may convert a user's spoken speech into text before processing the speech or for sharing with other modules, such as suggestion module 180.

Speech analysis module 165 may categorize a user's choice of words and phrases according to the setting or conversation participants. For example, speech analysis module 165 may indicate a correlation between words or phrases that a user utters and the person to whom the user is speaking. Speech analysis module 165 may also indicate a correlation between a user's speech and the local environment (e.g, a formal setting, informal setting, at work, at home, etc.), the time of day (e.g., a user is more likely to use "good morning" as a greeting before noon), the current weather or temperature, or any other correlation between the user's speech and the context of the speech. Speech analysis module 165 may determine the context of a user's conversation from data received by user device 105, such as geolocation, time, weather, call history, and the like. Thus, speech analysis module 165 may analyze a user's speech to generate and/or update a dictionary or listing of words and/or phrases that appear in a user's speech, along with the context of the speech and the frequency of usage of particular words and/or phrases. Speech analysis module 165 may store the results of analyzing speech data in database 190.

Brain data processing module 170 may process information collected via electroencephalography of a user's brain. For example, brain data processing module 170 may process information collected by the one or more EEG sensors 150 of wearable device 145. Brain data processing module 170 may process biosignals collected by EEG sensors 150 into discrete groupings that correspond to the words or phrases that the user is speaking. Thus, brain data processing module 170 may produce a database of brain activity measurements that correspond to a user's speech. Brain data processing module 170 may also indicate the location(s) of the brain from which biosignals are collected, such as the temporal lobe or frontal lobe, Wernicke's area, Broca's area, etc. Along with the brain activity measurements, brain data processing module 170 may also note the context of each measurement, such as the conversation participant, time of speech, location of speech, and any other contextual information. Furthermore, brain data processing module 170 may operate in tandem with speech analysis module 165 so that brain activity measurements can be associated with the actual words and/or phrases uttered by the user.

Text collection module 175 may analyze a user's writing samples to determine the user's language preferences. Text collection module 175 may obtain samples of a user's writings by accessing a user's e-mail accounts, social media accounts, publications, messaging history, and any other sources of writing samples produced by the user that have been uploaded to a network such as the Internet and/or are accessible over network 140. Text collection module 175 may also collect language samples from sources that are not authored by the user in order to collect a large sample size of general examples of the user's language. For example, text collection module 175 may ingest samples of text from the public domain, such as books, journals, magazines, news, and any other publications. Text collection module 175 may output a list of words and/or phrases that appear in a user's speech, and a list of words and/or phrases that appear in the user's language in general, along with the frequency of usage of particular words and/or phrases. In some embodiments, a user may provide his or her own text samples into text collection module 175 using a device such as user device 105.

Suggestion module 180 may determine a suggestion comprising a word or phrase with which to prompt a user encountering a speech disfluency. Suggestion module 180 may receive an indication that a user has encountered a speech disfluency from speech monitoring module 135, along with a context of the conversation at the time of the disfluency. Using the context of the conversation, suggestion module 180 may recommend a word or phrase to the user that the user was likely to have said next. Suggestion module 180 may receive input from user device 105, speech analysis module 165, brain data processing module 170, and text collection module 180 in order to determine the words or phrases that are most likely to successfully prompt the user. In some embodiments, suggestion module 180 stores a history of suggestions that were used to prompt the user in database 190; if a suggestion successfully prompted the user, the suggestion may be re-used when the user encounters a speech disfluency in a similar situation, and if the suggest was unsuccessful, then suggestion module 180 may not recommend it in the future. If suggestion module 180 determines that a user is encountering a speech disfluency in response to a question posed by another conversation participant, then suggestion module 180 may generate a suggestion that is most probably (according to the user's language data sources) an answer to the question.

Suggestion module 180 may make recommendations by identifying the user's particular conversational tendencies using machine learning techniques. Suggestion module 180 may employ various models to perform the learning (e.g., neural networks, mathematical/statistical models, classifiers, etc.). Suggestion module 180 may be trained using supervised or unsupervised learning. Suggestion module 180 may be trained with data collected from speech analysis module 165, brain data processing module 170, and text collection module 175. Thus, suggestion module 180 may generate a prompt including a word or phrase that is likely to aid a user suffering from a speech disfluency. In some embodiments, suggestion module 180 may process language data sources and generate prompts using IBM Watson.

Database 190 may be any non-volatile storage media known in the art. For example, database 190 can be implemented with a tape library, optical library, one or more independent hard disk drives, or multiple hard disk drives in a redundant array of independent disks (RAID). Similarly, data on database 190 may conform to any suitable storage architecture known in the art, such as a file, a relational database, an object-oriented database, and/or one or more tables. Database 190 may store data that is output from user device 105, wearable device 145, or any of the various modules in memory 160 of server 155.

Figure 2:
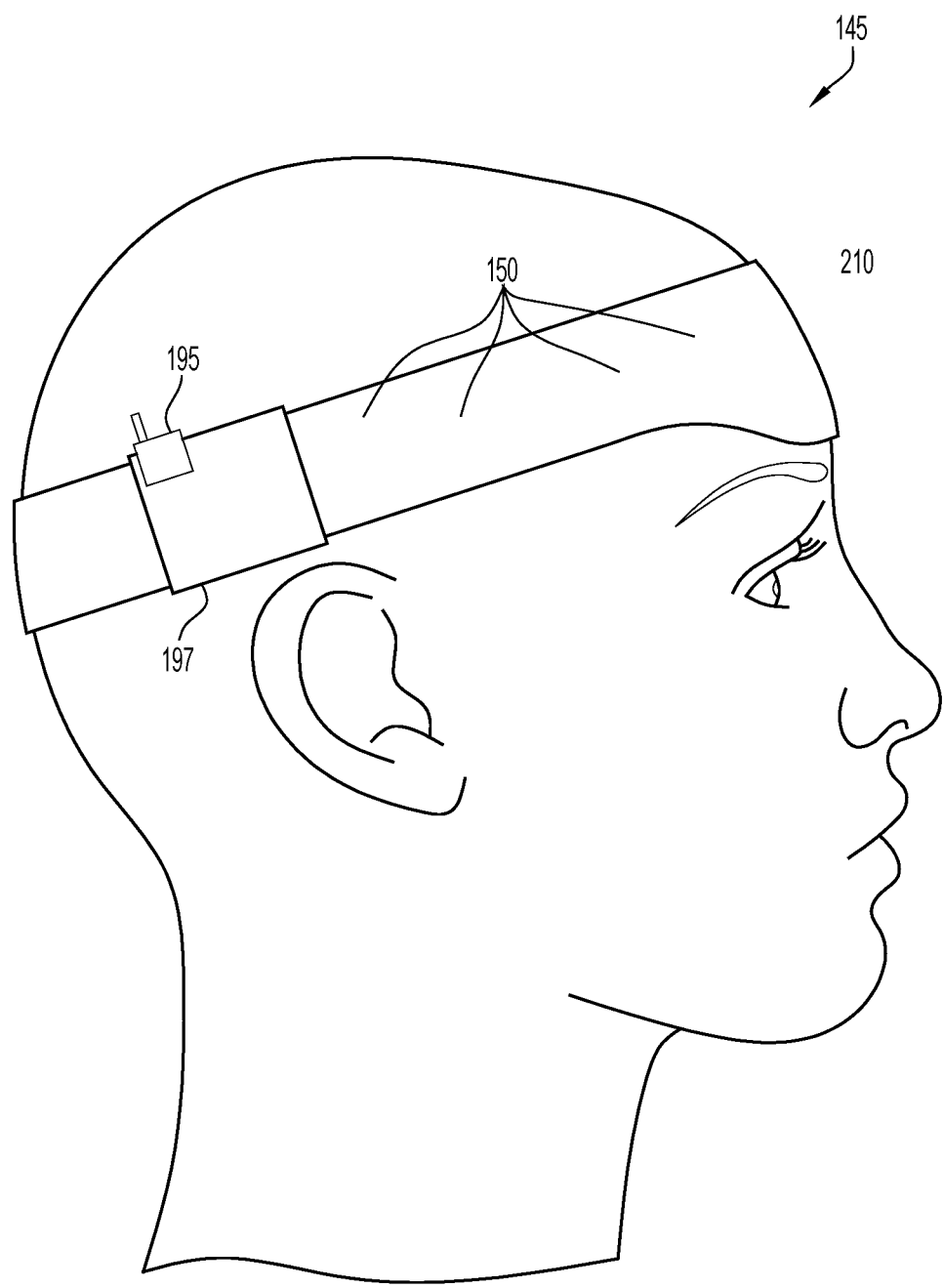
FIG. 2 illustrates an example of a wearable device in accordance with an embodiment of the present invention

FIG. 2 illustrates an example of a wearable device 145 in accordance with an embodiment of the present invention. As depicted, wearable device 145 includes EEG sensors 150, a network interface 195, a body 210, and a power supply 197. Wearable device 145 may facilitate the gathering of biosignals corresponding to a user's brain activity when worn by a user. The body 210 of wearable device 145 may be designed to rest on a user's ears and over the top of the user's head such that the EEG sensors 150 are positioned in a location of interest for collecting relevant biosignals. Power supply 197 may provide power for collecting biosignals with EEG sensors 150 and transmitting collected information with network interface 195.

Figure 3:
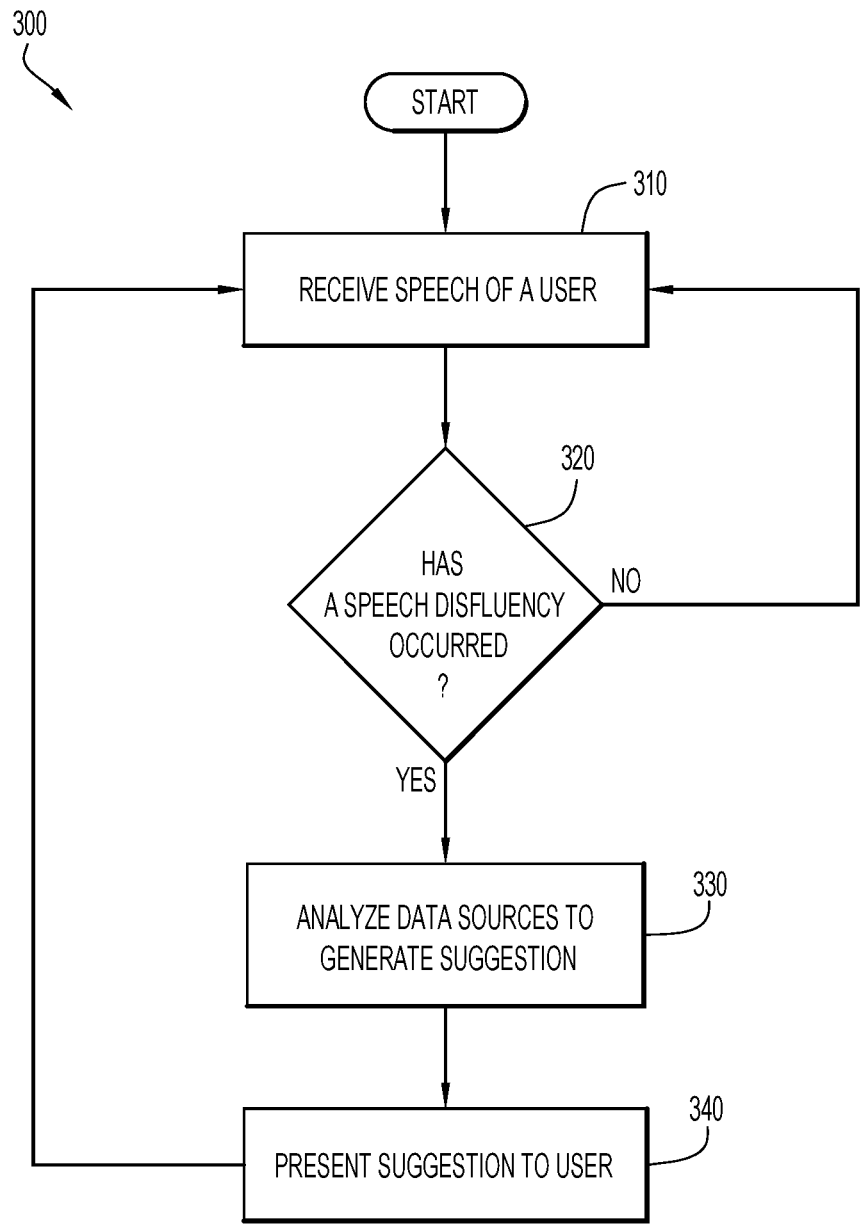
FIG. 3 is a flow chart depicting a method of prompting a user in accordance with an embodiment of the present invention.

FIG. 3 is a flow chart depicting a method 300 of prompting a user in accordance with an embodiment of the present invention.

Speech of a user is received at operation 310. Speech monitoring module 135 may monitor microphone 110 for sounds received that correspond to speech of the user. Speech monitoring module 135 may also monitor the speech of other conversation participants in order to establish a context of the conversation.

Operation 320 determines whether a speech disfluency has occurred. Speech monitoring module 135 may determine that the user has encountered a speech disfluency in response to an extended pause by a user during speech (as opposed to a pause at a natural break in speech, such as after posing a question). Speech monitoring module 135 may also determine that a speech disfluency has occurred when the user begins stammering or speaking in fillers such as "um" or "uh." Conventional or other speech processing or speech recognition techniques may be used to detect the occurrence of a speech disfluency. For example, a speech disfluency may be detected using a Hidden Markov model, dynamic time warping, neural networks, deep learning, and the like.

One or more data sources are analyzed to generate a suggestion at operation 330. In some embodiments, speech monitoring module 135 notifies server 155 that the user has encountered a speech disfluency, and suggestion module 180 determines a suggestion comprising a word or phrase that is intended to prompt the user. Suggestion module 180 may analyze input from speech monitoring module 135, speech analysis module 165, brain data processing module 170, text collection module 175, and/or database 190 in order to generate a suggestion.

Processing the information from speech monitoring module 135, speech analysis module 165, brain data processing module 170, text collection module 175, and/or database 190, suggestion module 180 may consider the context of the conversation, such as the topic being discussed, the words spoken by the user leading up to the speech disfluency, the location and setting of the conversation, and the like.

Suggestion module 180 may determine a current context of the user's conversation by processing the words spoken in a current conversation, including processing word choice, types of questions being asked, topics of discussion, tone of conversation based on tone/pitch of voices (e.g., friendly, argumentative, etc.), location of the conversation, time of day of the conversation, degree to which the language used is formal or informal, and the like. Suggestion module 180 may also analyze the user's brain data collected by brain data processing module 170 in order to look for brain activity that is similar to the user's brain activity during a similar conversation. For example, if the user's brain activity is similar to activity during a previous speech disfluency, suggestion module 180 may select a suggestion that is similar to the previously-used suggestion (if the previous suggestion successfully prompted the user), or suggestion module 180 may select a different suggestion (if the previous suggestion failed to prompt the user).

Suggestion module 180 may also generate a suggestion by taking into the user's language preferences as determined by text collection module 175. For example, if a user is conversing about a topic that the user has not discussed verbally before, but has written about, then suggestion module 180 may process the user's written language preferences as determined by text collection module 175 in order to find examples of the sort of words or phrases that the user would tend to use when discussing the topic.

In some embodiments, suggestion module 180 will determine which word or phrase the user may have intended to say next by reviewing the user's prior speech history and suggesting the most common word or phrase associated with the previous word or words spoken by the user. Suggestion module 180 may generate suggestions in a language in which the user is fluent, or in the language currently being spoken by conversation participants. Suggestion module 180 may also take a user's opinions into consideration. For example, if the context of a conversation is a favorite local restaurant, suggestion module 180 may be able to prompt a user with the user's favorite restaurant based on the user's previous speech history (e.g., as determined according to data from speech analysis module 165). Suggestion module 180 may determine a user's opinions and preferences, such as the degree to which a user finds a certain choice or option favorable or unfavorable, based on the user's previous language history surrounding that choice or option. For example, if a user tends to use pejorative words in proximity to a particular brand, suggestion module 180 may determine that the user holds a poor opinion of that brand. If the user is not aware of their own opinion on a matter, then suggestion module 180 may analyze social data (e.g., as collected by text collection module 175) of the user to generate personalized results that include the user's probable preference.

The suggestion is presented to the user at operation 340. Suggestion module 180 may send a suggestion to user device 105, which displays the suggestion as text on display 120. The suggestion may be converted to a spoken word or phrase using artificial speech synthesis, and generated as audio using audio speaker 115 for the user to hear. In some embodiments, the suggestion is both displayed on display 120 and generated as audio using audio speaker 115. Once the suggestion is presented to the user, method 300 may return to operation 310 so that the user may be prompted in response to another speech disfluency.

Figure 4:
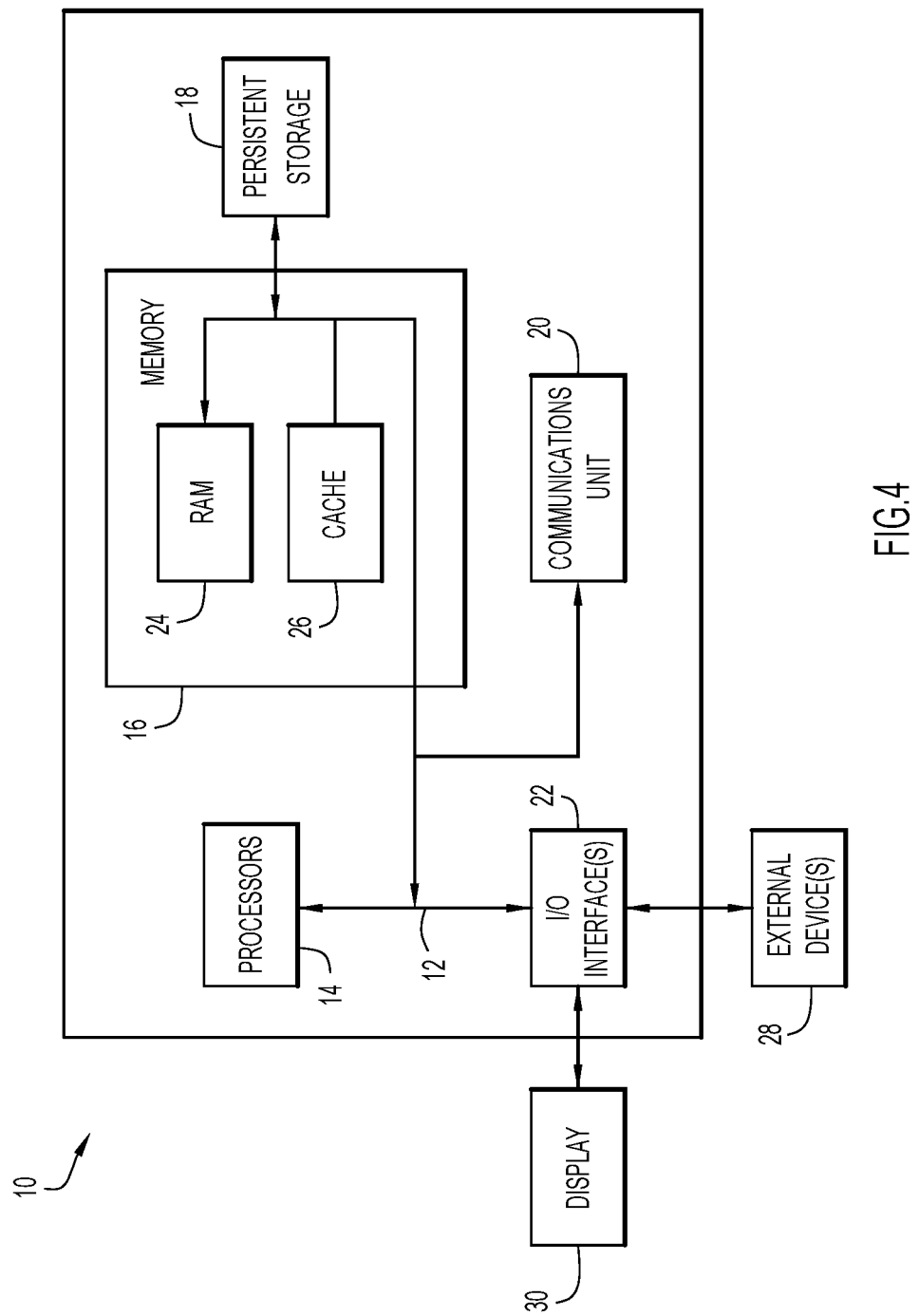
FIG. 4 is a block diagram depicting a computing device in accordance with an embodiment of the present invention.

FIG. 4 is a block diagram depicting components of a computer 10 suitable for executing the methods disclosed herein. Computer 10 may implement user device 105 and/or server 155 to provide context-based language prompting in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data, including data transmitted between user device 105, wearable device 145, and/or server 155, and data collected, processed, and/or output by user device 105, wearable device 145, speech analysis module 165, brain data processing module 170, text collection module 175, and/or suggestion module 180, may be stored within any conventional or other data structures (e.g., files, arrays, lists, stacks, queues, records, etc.) and may be stored in any desired storage unit (e.g., database, data or other repositories, queue, etc.). The data may include any desired format and arrangement, and may include any quantity of any types of fields of any size to store the data. The definition and data model for any of the data may indicate the overall structure in any desired fashion (e.g., computer-related languages, graphical representation, listing, etc.).

Data, including data transmitted between user device 105, wearable device 145, and/or server 155, and data collected, processed, and/or output by user device 105, wearable device 145, speech analysis module 165, brain data processing module 170, text collection module 175, and/or suggestion module 180, may include any information provided to user device 105, wearable device 145, and/or server 155. Data may include any desired format and arrangement, and may include any quantity of any types of fields of any size to store any desired data. The fields may indicate the presence, absence, actual values, or any other desired characteristics of the data of interest (e.g., quantity, value ranges, etc.). The data may include all or any desired portion (e.g., any quantity of specific fields) of personal information (PI) or other data of interest within a given implementation or system. The data may indicate the overall structure in any desired fashion (e.g., computer-related languages, graphical representation, listing, etc.). The fields for each data entry may be selected automatically (e.g., based on metadata, common or pre-defined models or structures, etc.) or manually (e.g., pre-defined, supplied by a data owner, etc.) in any desired fashion for a particular implementation or system. Metadata (e.g., relating to the context of speech, frequency of use of a word etc.) may include any suitable information providing a description of fields or information (e.g., description of content, data type, etc.).

The data transmitted between user device 105, wearable device 145, and/or server 155, and data collected, processed, and/or output by user device 105, wearable device 145, speech analysis module 165, brain data processing module 170, text collection module 175, and/or suggestion module 180 may include any data collected about entities by any collection mechanism, any combination of collected information, any information derived from analyzing collected information, and any combination thereof. Suggestion module 180 may generate a suggestion by processing any of the data collected by any collection mechanism, either by itself, or in combination with one or more others, such as user device 105, wearable device 145, speech analysis module 165, brain data processing module 170, text collection module 175, and/or suggestion module 180.

The present invention embodiments may employ any number of any type of user interface (e.g., Graphical User Interface (GUI), command-line, prompt, etc.) for obtaining or providing information (e.g., data in a dataset), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of context-based language prompting.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., speech monitoring module 135, speech analysis module 165, brain data processing module 170, text collection module 175, suggestion module 180, etc.). These systems may include any types of monitors and input devices (e.g., keyboard, mouse, voice recognition, etc.) to enter and/or view information.

It is to be understood that the software (e.g., speech monitoring module 135, speech analysis module 165, brain data processing module 170, text collection module 175, suggestion module 180) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., speech monitoring module 135, speech analysis module 165, brain data processing module 170, text collection module 175, suggestion module 180) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., speech and language data). The database system may be implemented by any number of any conventional or other databases, data stores or storage structures (e.g., files, databases, data structures, data or other repositories, etc.) to store information (e.g., data in a dataset). The database system may be included within or coupled to the server and/or client systems. The database systems and/or storage structures may be remote from or local to the computer or other processing systems, and may store any desired data (e.g., speech and language data).

The present invention embodiments may employ any number of any type of user interface (e.g., Graphical User Interface (GUI), command-line, prompt, etc.) for obtaining or providing information (e.g., data in a dataset), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of processing speech, the method comprising:
receiving speech of a user from an audio sensor;
determining an interruption in the speech of the user and analyzing the speech of the user to determine a context of the speech at a time of the interruption;
analyzing one or more language data sources to generate a suggestion corresponding to the interruption and based on the determined context of the speech, wherein generating the suggestion comprises determining one or more words to automatically prompt the user to complete the speech after the interruption, and wherein the one or more language data sources include one or more from a group of: a document written by the user, a speech history of the user, a social media history of the user, prior suggestions to the user, and brain data of the user; and
presenting the suggestion to the user.

2. The computer-implemented method of claim 1, wherein the interruption comprises one or more from a group of: a pause in speech and a filler word.

3. The computer-implemented method of claim 1, wherein the brain data comprises data collected from the user with an electroencephalography device.

4. The computer-implemented method of claim 1, wherein the suggestion is presented by one or more of: a display of a mobile device, and an audio speaker of a mobile device.

5. The computer-implemented method of claim 1, wherein the determined context is a question posed to the user, and wherein the suggestion comprises a response to the question.

6. A computer system for processing speech, the computer system comprising:
one or more computer processors;
one or more computer readable storage media;
program instructions stored on the one or more computer readable storage media for execution by at least one of the one or more computer processors, the program instructions comprising instructions to:
receive speech of a user from an audio sensor;
determine an interruption in the speech of the user and analyze the speech of the user to determine a context of the speech at a time of the interruption;
analyze one or more language data sources to generate a suggestion corresponding to the interruption and based on the determined context of the speech, wherein generating the suggestion comprises determining one or more words to automatically prompt the user to complete the speech after the interruption, and wherein the one or more language data sources include one or more from a group of: a document written by the user, a speech history of the user, a social media history of the user, prior suggestions to the user, and brain data of the user; and
present the suggestion to the user.

7. The computer system of claim 6, wherein the interruption comprises one or more from a group of: a pause in speech and a filler word.

8. The computer system of claim 6, wherein the brain data comprises data collected from the user with an electroencephalography device.

9. The computer system of claim 6, wherein the suggestion is presented by one or more of: a display of a mobile device, and an audio speaker of a mobile device.

10. The computer system of claim 6, wherein the determined context is a question posed to the user, and wherein the suggestion comprises a response to the question.

11. A computer program product for processing speech, the computer program product comprising one or more computer readable storage media collectively having program instructions embodied therewith, the program instructions executable by a computer to cause the computer to:

receive speech of a user from an audio sensor;
determine an interruption in the speech of the user and analyze the speech of the user to determine a context of the speech at a time of the interruption;
analyze one or more language data sources to generate a suggestion corresponding to the interruption and based on the context of the speech, wherein generating the suggestion comprises determining one or more words to automatically prompt the user to complete the speech after the interruption, and wherein the one or more language data sources include one or more from a group of: a document written by the user, a speech history of the user, a social media history of the user, prior suggestions to the user, and brain data of the user; and
present the suggestion to the user.

12. The computer program product of claim 11, wherein the interruption comprises one or more from a group of: a pause in speech and a filler word.

13. The computer program product of claim 11, wherein the brain data comprises data collected from the user with an electroencephalography device.

14. The computer program product of claim 11, wherein the suggestion is presented by one or more of: a display of a mobile device, and an audio speaker of a mobile device.

15. The computer program product of claim 11, wherein the determined context is a question posed to the user, and wherein the suggestion comprises a response to the question.

\* \* \* \* \*